(12) United States Patent
Hyun et al.

(10) Patent No.: US 9,237,833 B2
(45) Date of Patent: Jan. 19, 2016

(54) VACUUM CLEANER AND DUST CONTAINER

(71) Applicant: LG Electronics Inc., Seoul (KR)

(72) Inventors: Kietak Hyun, Seoul (KR); Goondong Park, Seoul (KR); Seungyeop Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/514,748

(22) Filed: Oct. 15, 2014

(65) Prior Publication Data

US 2015/0107046 A1 Apr. 23, 2015

(30) Foreign Application Priority Data

Oct. 18, 2013 (KR) .................. 10-2013-0124470

(51) Int. Cl.
*A47L 9/14* (2006.01)
*A47L 9/12* (2006.01)
*A47L 9/10* (2006.01)
*B01D 46/00* (2006.01)
*A47L 9/16* (2006.01)
*A47L 9/19* (2006.01)

(52) U.S. Cl.
CPC ............ *A47L 9/1409* (2013.01); *A47L 9/102* (2013.01); *A47L 9/108* (2013.01); *A47L 9/125* (2013.01); *A47L 9/1666* (2013.01); *A47L 9/19* (2013.01); *B01D 46/0002* (2013.01)

(58) Field of Classification Search
CPC ......... A47L 9/1409; A47L 9/102; A47L 9/19; A47L 9/125; B01D 6/0002
See application file for complete search history.

(56) References Cited

U.S. PATENT DOCUMENTS

| 7,343,642 | B2 * | 3/2008 | Streciwilk | A47L 9/127 15/352 |
| 7,399,332 | B1 | 7/2008 | Morey et al. | |
| 7,803,205 | B2 * | 9/2010 | Oh | A47L 9/122 55/337 |
| 9,125,534 | B2 * | 9/2015 | Kim | A47L 9/122 1/1 |
| 2006/0236663 | A1 | 10/2006 | Oh | |
| 2007/0011998 | A1 | 1/2007 | Yoo et al. | |
| 2009/0300871 | A1 * | 12/2009 | Seo | A47L 5/28 15/347 |

FOREIGN PATENT DOCUMENTS

| EP | 1419724 A2 | 5/2004 |
| JP | 2006297057 A | 11/2006 |
| KR | 100626736 B1 | 9/2006 |
| KR | 1020070042793 A | 4/2007 |
| KR | 101253194 B1 | 5/2012 |
| KR | 1020120054225 A | 5/2012 |
| WO | 2005053494 A2 | 6/2005 |

* cited by examiner

*Primary Examiner* — Dung Van Nguyen
(74) *Attorney, Agent, or Firm* — Dentons US LLP

(57) ABSTRACT

A vacuum cleaner includes a cleaner body and a dust container separably mounted on the cleaner body. The dust container includes a dust collection body including an opening, a wall, and a dust separation part. A cover covers the opening of the dust collection body. An air guide is disposed at the dust collection body, the air guide having an opening provides an inflow hole through which air separated from dust in the dust separation part is introduced, and a filter accommodated in the air guide filters the air separated from the dust. When the cover uncovers the opening of the dust collection body, the filter is visible through the opening of the air guide.

17 Claims, 11 Drawing Sheets

VACUUM CLEANER AND DUST CONTAINER

CROSS-REFERENCE TO RELATED APPLICATIONS

The present application claims priority under 35 U.S.C. 119 and 35 U.S.C. 365 to Korean Patent Application No. 10-2013-0124470 (filed on Oct. 18, 2013), which is hereby incorporated by reference in its entirety.

BACKGROUND

In general, vacuum cleaners are devices that suction air containing dust by using a vacuum pressure generated by a suction motor mounted in a main body to filter the dust within the main body.

Such a vacuum cleaner may be mainly classified into a canister type vacuum cleaner in which a suction nozzle is provided separately with respect to a main body and connected to the main body by using a connection tube, and an upright type vacuum cleaner in which a suction nozzle is coupled to a main body.

A vacuum cleaner disclosed in Korean Patent Registration No. 1038827 includes a cleaner body, a dust separation device separably mounted on the cleaner body and a dust collection device mounted independently separably with respect to the dust separation device on the cleaner body. The dust separation device includes a cyclone unit and a filter unit.

In that vacuum cleaner, since the dust collection device and the dust separation device are independently provided, and the dust separation device is constituted by the cyclone unit and the filter unit, a user has to manage each of the devices separately, and thereby inconveniences the user.

Also, since the dust collection device and the dust separation device are independently mounted, a passage for allowing the dust collection device to communicate with the dust separation device may increase in length to cause a passage loss as dust piles up in the passage.

In addition, since the filter unit is covered by a cover member disposed on the cleaner body, and a filter is covered by first and second cases constituting the filter unit, it may be difficult to be confirmed by the user as to whether the filter is blocked requiring cleaning or replacement.

SUMMARY

Embodiments provide a dust container in which whether cleaning of a filter is required is easily confirmed, and the filter together with the dust container is cleanable and a vacuum cleaner.

In one embodiment, a vacuum cleaner includes: a cleaner body; and a dust container separably mounted at the cleaner body, wherein the dust container comprises: a dust collection body comprising a first opening and a wall, and a dust separation part; a cover covering the first opening of the dust collection body; an air guide comprising a second opening and an end, the air guide having the end disposed at the wall of the dust collection body, the second opening of the air guide providing an inflow hole through which air separated from dust in the dust separation part is introduced; and a filter accommodated in the air guide to filter the air separated from the dust, wherein when the cover uncovers the first opening of the collection body, the filter is visible through the second opening of the air guide.

In another embodiment, a vacuum cleaner includes: a cleaner body; and a dust container separably mounted at the cleaner body, wherein the dust container comprises: a dust collection body comprising a wall and a dust separation part, the wall of the dust collection body comprising an opening; an air guide comprising an inflow hole and an end, the end of the air guide disposed at the wall of the dust collection body; a filter accommodated at the air guide to filter the air separated from the dust, wherein an air passage through which the air introduced through the inflow hole flows is defined between the air guide and the filter, wherein the air passing through the air passage and through the filter is discharged through the opening of the wall of the dust collection body.

In further another embodiment, a dust container includes: a dust collection body comprising a first opening, a wall and a dust separation part, the wall of the dust collection body comprising a second opening; a cover covering the first opening of the dust collection body; a filter that filters the air separated from the dust in the dust separation part; a filter supporter to support the filter, wherein the air passing through the filter passes through the filter supporter and is discharged to an outside of the dust collection body through the second opening and the filter and the filter supporter are removable through the second opening.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
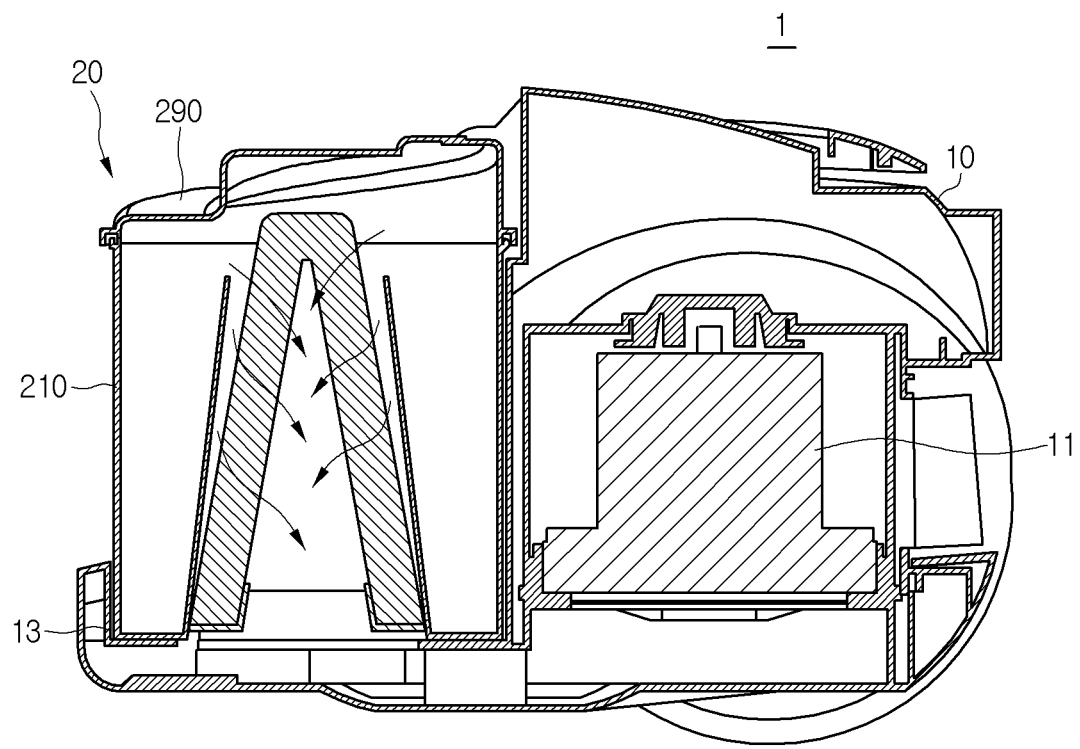
FIG. 1 is a schematic cross-sectional view of a vacuum cleaner according to a first embodiment.
Figure 2:
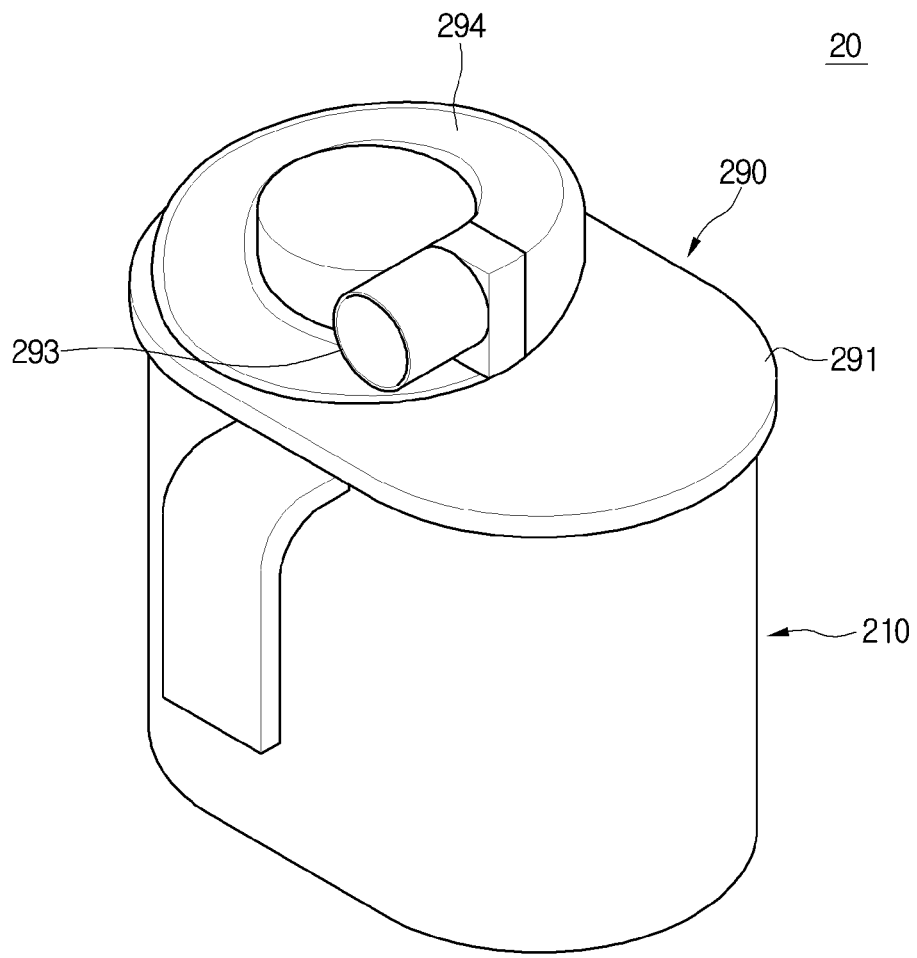
FIG. 2 is a schematic perspective view of a dust container according to the first embodiment.

FIG. 1 is a schematic cross-sectional view of a vacuum cleaner according to a first embodiment, and FIG. 2 is a schematic perspective view of a dust container according to the first embodiment.

Hereinafter, although a canister type vacuum cleaner is described as an example, the concept of the current embodiment may be equally applied to an upright type vacuum cleaner or a robot cleaner.

Referring to FIGS. 1 and 2, a vacuum cleaner 1 according to the current embodiment may include a cleaner body 10 including a suction motor 11 and a dust container 20 separably mounted on the cleaner body 10. The dust container 20 may be mounted on a mounting part 13 provided in the cleaner body 10.

In the current embodiment, the dust container 20 may perform a dust separation function for suctioning air containing dust to separate the dust from the air and a dust storage function for storing the dust separated from the air. That is, the dust container 20 includes a dust separation part and a dust storage part.

Alternatively, the vacuum cleaner according to the current embodiment may include only the dust container 20 for separating or storing dust or may further include an additional dust separation part or dust container at an upper or lower side thereof.

The dust container 20 may include a dust collection body 210 for separating and storing dust and a cover 290 for covering one side of the dust collection body 210. For example, the dust collection body 210 may have an upper opening. The cover 290 may cover the upper opening of the dust collection body 210. Also, when the cover 290 is separated from the dust collection body 210, the dust stored in the dust collection body 210 may be discharged to the outside through the upper opening.

The cover 290 may include a cover body 291 covering the dust collection body 210, a suction hole 293 through which the air containing the dust is suctioned, and a flow guide 294 through which the dust and air suctioned through the suction hole 293 flow and are guided into the dust collection body 210. The flow guide 294 may protrude upward from the cover body 291 to guide the dust and air suctioned through the suction hole 293 so that the dust and air flow in a spiral shape.

Hereinafter, the dust container 20 will be described in more detail.

Figure 3:
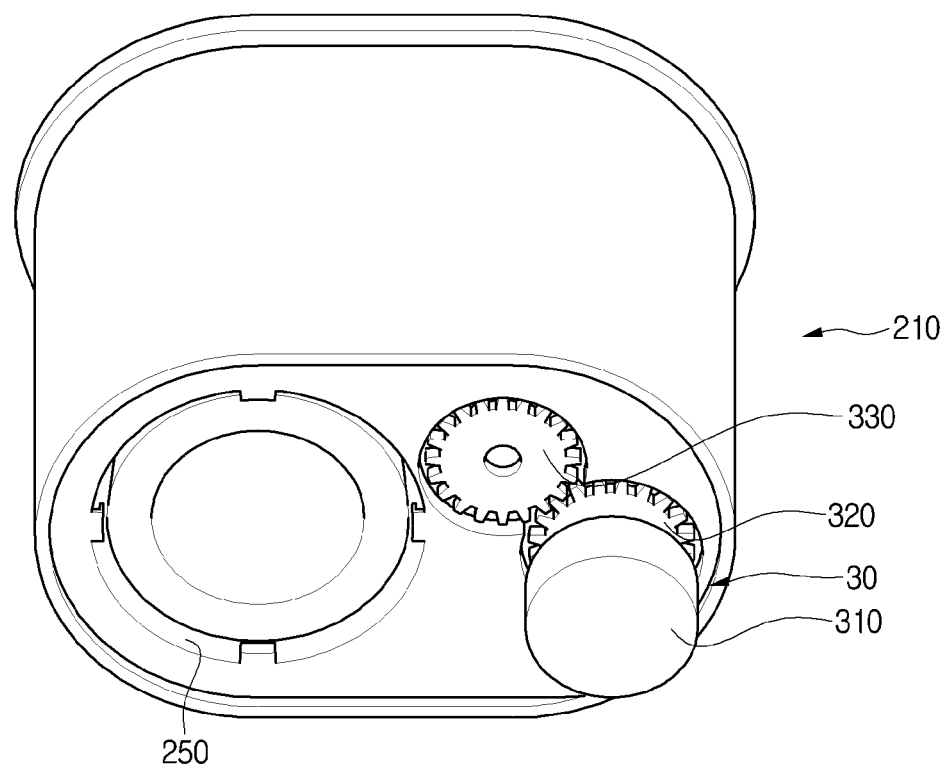
FIG. 3 is a lower perspective view of the dust container according to the first embodiment.
Figure 4:
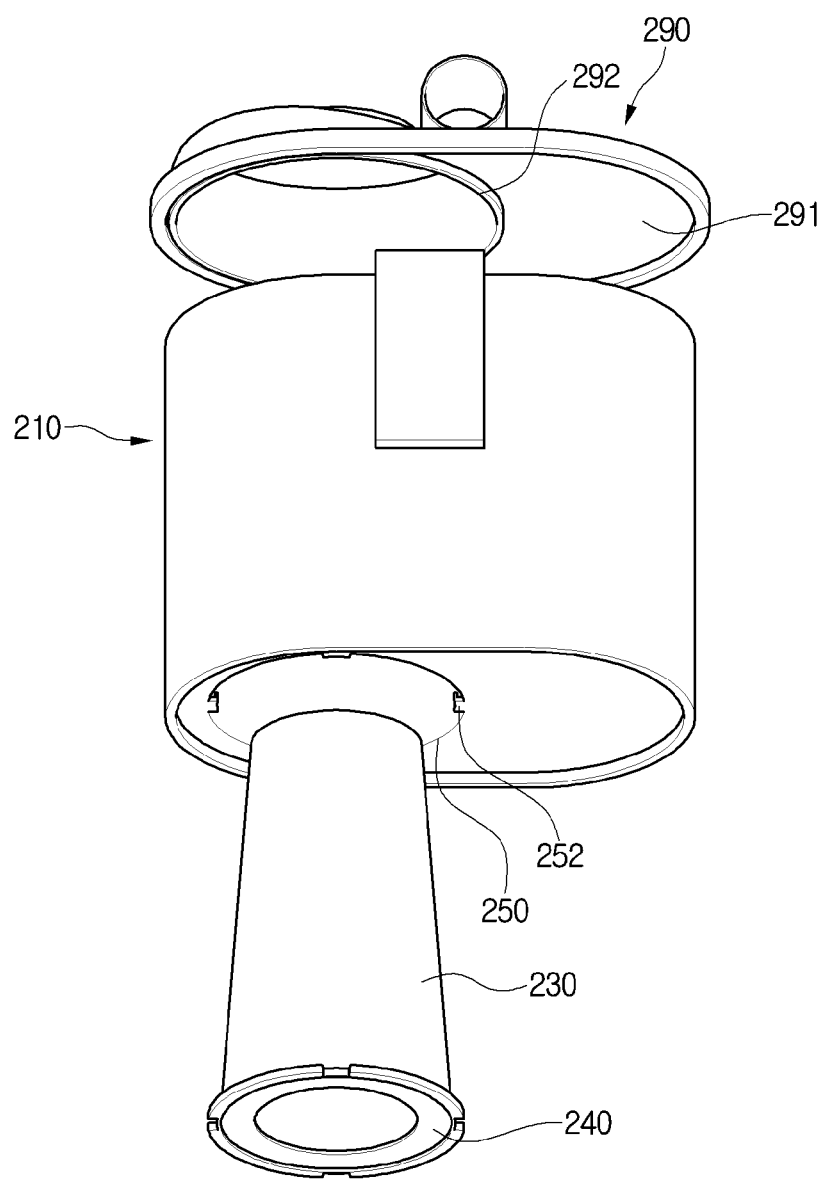
FIG. 4 is an exploded perspective view of the dust container according to the first embodiment.
Figure 5:
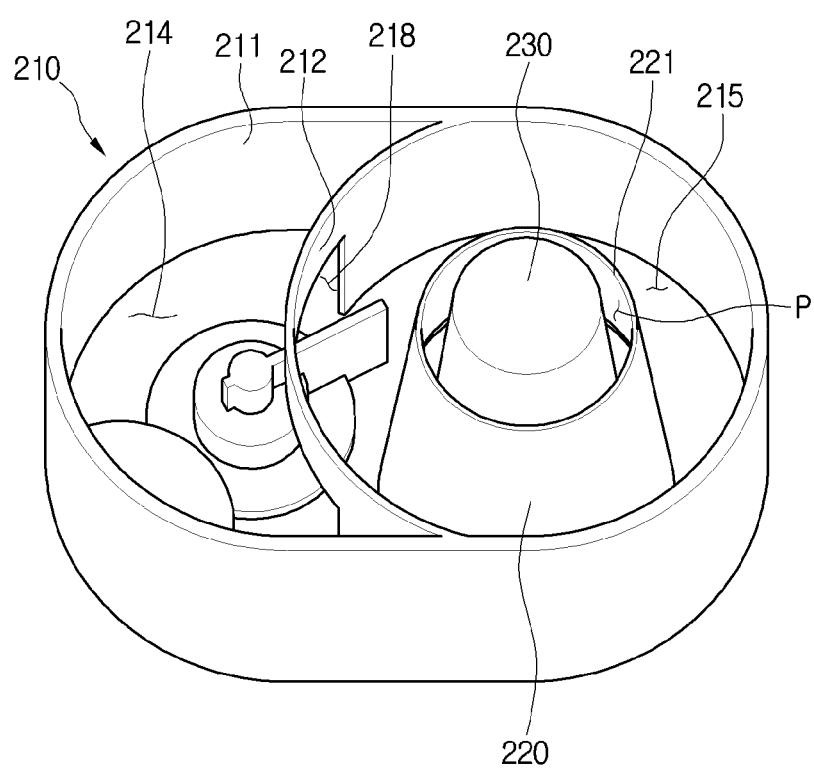
FIG. 5 is an inside perspective view of a dust collection body according to the first embodiment.
Figure 6:
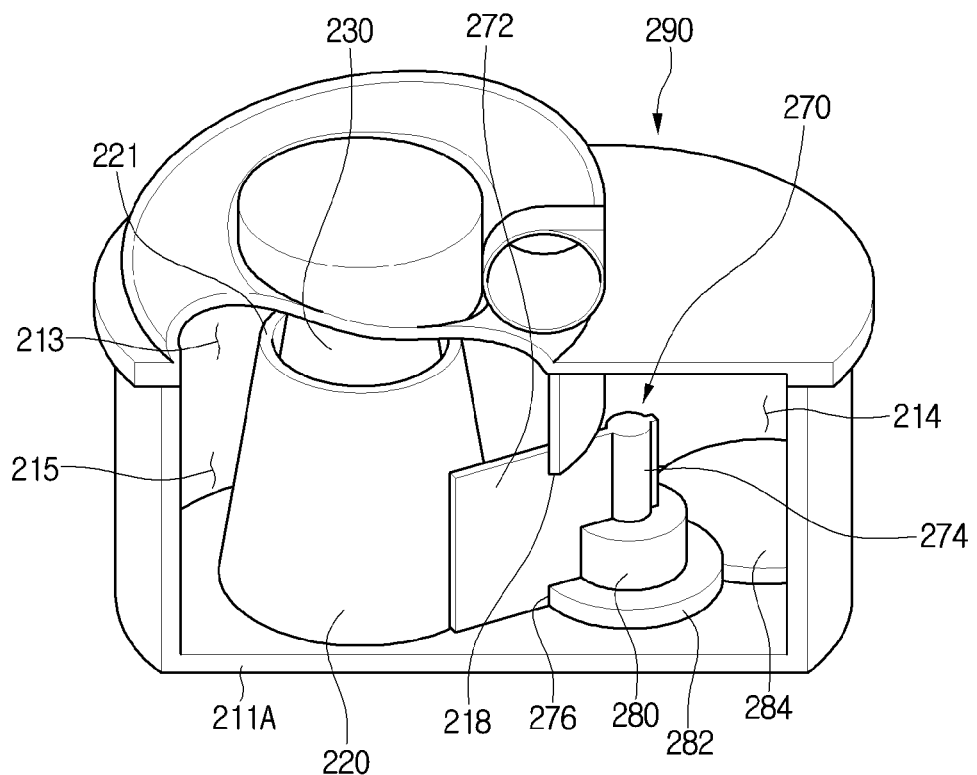
FIG. 6 is a longitudinal cut view of the dust container according to the first embodiment.
Figure 7:
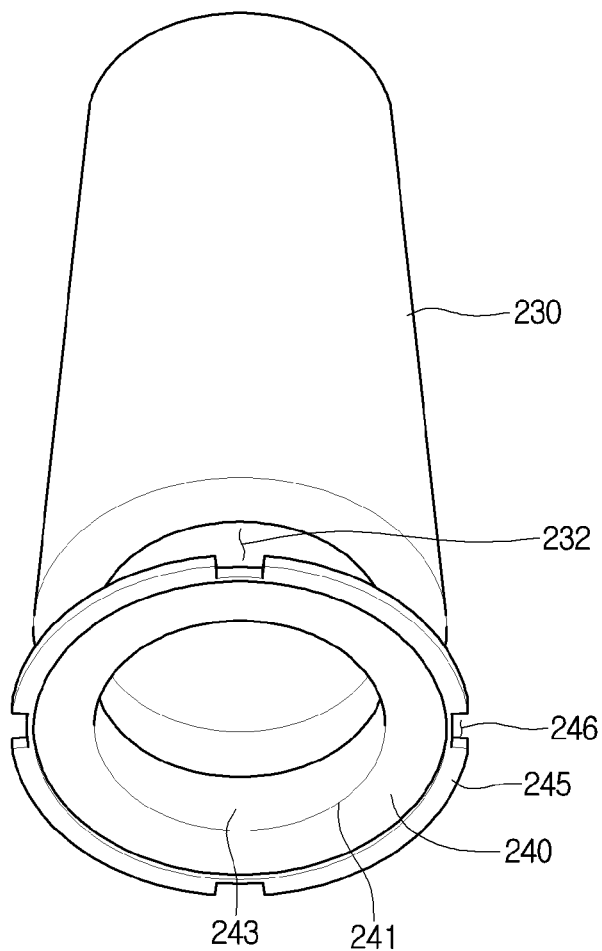
FIG. 7 is a lower perspective view of a filter and a filter supporter.

FIG. 3 is a lower perspective view of the dust container according to the first embodiment, FIG. 4 is an exploded perspective view of the dust container according to the first embodiment, FIG. 5 is an inside perspective view of the dust collection body according to the first embodiment, FIG. 6 is a longitudinal cut view of the dust container according to the first embodiment, and FIG. 7 is a lower perspective view of a filter and a filter supporter.

Referring to FIGS. 3 to 7, the dust collection body 210 according to the current embodiment may include a first wall 211, a second wall 212 partitioning an inner space of the first wall 211 into a plurality of spaces, and a bottom wall 211A.

The first wall 211 may have a non-circular shape. For example, although the first wall 211 has an oval shape, the current embodiment is not limited thereto. The second wall 212 may partition the inner space of the first wall 211 into a first dust storage part 214 and a second dust storage part 215.

A portion of an inner circumference surface of the first wall 211 and one surface of the second wall 212 may define the first dust storage part 214. The other portion of the inner circumferential surface of the first wall 211 and the other surface of the second wall 212 may define the second dust storage part 215.

For example, the second dust storage part 215 may have a circular shape, and the first dust storage part 214 may have a non-circular shape. The first dust storage part 214 may be disposed outside the second dust storage part 215.

The other portion of the inner circumferential surface of the first wall 211 and the other surface of the second wall 212 may additionally define the dust separation part 213. That is, the dust separation part 213 and the second dust storage part 215 may be disposed in the same space, and the dust separation part 213 may be disposed above the second dust storage part 215.

A hole 292 having a shape corresponding to that of the dust separation part 213 may be defined in the cover body 291. The dust and air spirally flowing along the flow guide 294 of the cover body 291 may be introduced into the dust separation part 213 through the hole 292.

Here, the air discharged from the flow guide 294 may spirally flow along the inner circumferential surface of the dust separation part 213 to generate a cyclone flow within the dust separation part 213.

A communication hole 218 for allowing the second dust storage part 215 to communicate with the first dust storage part 214 may be defined in the second wall 212. The communication hole 218 may be defined upward from a lower end of the second wall 212 up to a predetermined height. Here, the communication hole 218 may have a height less than about ⅔ of the total height of the second wall 212. This is done for separating the dust and air at an upper portion of the second wall 212.

In another embodiment, the dust collection body 210 may include a main wall having a cylindrical shape to define the second dust storage part 215 and an auxiliary wall surrounding a portion of the main wall to define the first dust storage part 214. In this case, the communication hole 218 may be defined in the main wall.

According to the current embodiment, the dust separated from the air by the dust separation part 213 may flow downward toward the second dust storage part 215 to flow into the first dust storage part 214 through the communication hole 218.

The dust collection body 210 may further include an air guide 220 for guiding the discharge of the air separated from the dust. The air guide 220 may extend upward from the bottom wall 211A of the dust collection body 210. The air guide 220 may be integrated with the bottom wall 211A or may be separably coupled to the bottom wall 211A.

The air guide 220 has an inflow hole 221. The air separated from the dust in the dust separation part 213 may be introduced into the air guide 220 through the inflow hole 221.

The air guide 220 may have a truncated cone or cylindrical shape with a hollow center. Here, the air guide 220 and the dust separation part 213 or the second dust storage part 215 may have the same center.

An opening 250 through which the air is discharged may be defined in the bottom wall 211A of the dust collection body 210. The air guide 220 may extend upward from the periphery of the bottom wall 211A having the opening 250. Also, the air guide 220 is spaced apart from the first wall 211 and the second wall 212.

Thus, the air guide 220 may prevent the dust (or the air or air containing the dust) flowing into the second dust storage part 215 from being discharged to the outside of the dust collection body 210 through the opening 250.

Substantially, the air and the dust are separated in an outer region of the air guide 220, and then the separated dust flows toward the second dust storage part 215. Since the air guide 220 is provided in the dust separation part 213, the cyclone flow may be smoothly generated within the dust separation part 213.

The air guide 220 may have a height less than that of the dust collection body 210. Thus, the air separated from the dust in the dust separation part 213 may be easily introduced into the air guide 220.

A filter 230 for filtering the air separated from the dust may be accommodated in the air guide 220. The current embodiment is not limited to a kind of filter 230, for example, a pre filter or sponge type filter.

The filter 230 may have a cylindrical or truncated cone shape. For example, when the air guide 220 has the cylindrical shape, the filter 230 may have the cylindrical shape. On the other hand, when the air guide 220 has the truncated cone shape, the filter 230 may have the truncated cone shape. Alternatively, the filter 230 may have the truncated cone shape, and the air guide 220 may have the cylindrical shape, and vice versa.

The filter 230 may be inserted into the air guide 220 through the opening 250 from the outside of the dust collection body 210. In the state where the filter 230 is inserted into the air guide 220, at least one portion of an outer surface of the filter 230 may be spaced apart from an inner surface of the air guide 220. Thus, an air passage P through which the air introduced into the air guide 220 through the inflow hole 221 flows may be defined between the outer surface of the filter 230 and the inner surface of the air guide 220.

Here, when the air passage P is viewed from an upper side of the air guide 220, the air passage P may have a circular ring shape.

The air passage P may have a passage cross-sectional area that gradually decreases downward from an upper portion of the air guide 220 toward a lower portion of the air guide 220, or is uniform.

According to the current embodiment, since the air passage P is defined between the outer surface of the filter 230 and the inner surface of the air guide 220, the air introduced into the air guide 220 may not flow into an upper portion of the filter 230 and also may flow downward along the air passage P to pass through a lower portion of the filter 230.

Thus, the air may substantially pass through an entire surface of the filter 230. According to the current embodiment, since a surface area of the filter 230 contacting the air increases, filtering performance may be improved.

Also, since the filter 230 increases in surface area, and the air passes through the entire surface of the filter 230, the phenomenon in which a portion of the filter 230 is blocked may be prevented to thereby reduce the number of times the filter 230 is cleaned. Also, the filter 230 may be improved in performance and be used for a long time.

To reduce the passage loss by the filter 230, the filter 230 may be hollow with a lower opening 232, and an upper side of the filter 230 may be covered. Thus, the air passing through the filter 230 may flow through the hollow filter and through the lower opening 232 to pass through the opening 250 of the bottom wall 211A. The hollow filter 230 may be a truncated cone or a cylindrical shape.

The filter 230 accommodated in the air guide 220 may have an upper end passing through the inflow hole 221 of the air guide. In the state where the filter 230 is accommodated in the air guide 220, the upper end of the filter 230 may be disposed at the same height as that of an upper end of the air guide 220 or disposed higher than the upper end of the air guide 220. Alternatively, the filter 230 may have a height equal to or greater than that of the air guide 220.

If the filter 230 has a height greater than that of the air guide 220, the upper end of the filter 230 accommodated in the air guide 220 may be disposed at a height equal to or greater than that of the upper end of the dust collection body 210. Alternatively, the filter 230 may have a height equal to or greater than that of the dust collection body 210. Thus, the upper end of the filter 230 may be disposed in the flow guide 294 of the cover 290.

A portion of the air within the dust separation part 213 may pass through a portion of the filter 230 which is at the outside of the air guide 220, and the other portion of the air may be introduced into the air passage P within the air guide 220 to pass through the filter 230 within the air guide 220.

When the cover 290 is separated from the dust collection body 210, an upper portion of the filter 230 may be directly exposed to the outside.

According to the current embodiment, when the user separates the cover 290 from the dust collection body 210 to empty the dust storage parts 214 and 215 containing the dust, the upper portion of the filter 230 may be directly exposed to the outside. Thus, the user may confirm a state of the upper portion of the filter 230 through a naked eye thereof to easily determine whether the cleaning of the filter 230 is required.

In the current embodiment, to allow the user to confirm the state of the upper portion of the filter 230, the filter 230 may have a height equal to or greater than that of the air guide 220. On the other hand, even though the filter has a height less than that of the air guide 220, the user may confirm the state of the filter 230 through the inflow hole 221 of the air guide 220.

The filter 230 may be supported by a filter supporter 240. The filter supporter 240 may include a support rib 243 inserted into the opening 232 of the filter 230 and a discharge hole 241 through which the air passing through the filter 230 is discharged.

The support rib 243 extends upward from an inner circular top surface of the filter supporter 240. The support rib 243 may contact an inner surface of the filter 230 in a state where the support rib 243 is inserted into the opening 232 of the filter 230. Thus, in the state where the filter 230 is supported by the filter supporter 240, the support rib 243 may prevent the filter 230 from being easily separated from the filter supporter 240. Alternatively, the support rib 243 may be spaced apart from the inner surface of the filter 230.

A plurality of coupling ribs 245 to couple to the dust collection body 210 may be disposed around the filter supporter 240. The plurality of coupling ribs 245 may be disposed along an outer circumference of the filter supporter 240 and be spaced apart from each other. A space 246 may be defined between two coupling ribs 245.

A plurality of protrusion parts 252 to couple to the filter supporter 240 may be disposed on the bottom wall 211A of the dust collection body 210. The plurality of protrusion parts 252 may be spaced apart from each other.

To couple the filter supporter 240 to the dust collection body 210, the space 246 of the filter supporter 240 and the protrusion part 252 of the dust collection body 210 may be aligned with each other. In this state, by rotating the filter supporter, the filter 230 supported by the filter supporter 240 may be accommodated into the air guide 220. That is, the protrusion part 252 may pass through the space 246 of the filter supporter 240. In this state, when the filter supporter 240 rotated by a predetermined angle, the protrusion part 252 may be coupled to the coupling rib 245.

When the filter supporter 240 is coupled to the dust collection body 210, the filter supporter 240 covers the opening 250 of the dust collection body 210.

In the current embodiment, a bottom surface of the filter 230 contacts a top surface of the filter supporter 240. Here, due to a structure of the filter 230, the air within the air passage P may not horizontally pass through the filter 230, but passes in a downwardly inclined direction from the outer surface of the filter 230 toward the inner surface of the filter 230 (see FIG. 1).

Thus, the filter 230 is pressed downward by a pressure of the air passing through the filter 230, and the bottom surface of the filter 230 is closely attached to the top surface of the filter supporter 240 to prevent the air from leaking between the bottom surface of the filter 230 and the top surface of the filter supporter 240.

Referring to FIGS. 3, 5, and 6, the dust container 20 may further include a pressing member for compressing the dust stored in the first dust storage part 214.

The pressing member 270 may be rotated by a driving device 30 to compress the dust stored in the first dust storage part 214.

The pressing member 270 may include a rotation shaft 274 and a pressing plate 272 coupled to the rotation shaft 274 or integrated with the rotation shaft 274. Here, the pressing plate 272 may have a height lower than the communication hole 218 of the second wall 212. Thus, the pressing plate 272 may pass through the communication hole 218.

A shaft guide 280 in which the rotation shaft 274 is inserted may be disposed on the bottom wall 211A of the dust collection body 210. The shaft guide 280 may protrude upward from the bottom wall 211A. The shaft guide 280 may have a cylindrical shape with an opening at the center. A portion of the rotation shaft 274 may be inserted into the opening of the shaft guide 280.

The driving device 30 may include a compression motor 310, a driving gear 320 connected to the compression motor 310, and a driven gear 330 engaged with the driving gear 320 and connected to the rotation shaft of the pressing member 270.

The compression motor 310 may be a bidirectionally rotatable motor, for example, a synchronous motor or a step motor. The compression motor 310 may be disposed on the cleaner body 10 by a motor mount (not shown). Hereinafter, the synchronous motor that is provided as an example of the compression motor 310 will be described. Thus, when an external force having a predetermined intensity or more is applied to the compression motor 310 in a direction opposite to a rotational direction of the compression motor 310, the compression motor 310 may automatically change in its rotational direction (e.g., rotational direction opposite to its current rotational direction).

A shaft of the driven gear 330 may be inserted into the shaft guide 280 from a lower side of the dust collection body 210 and then be coupled to the rotation shaft 274 of the pressing member 270.

In the current embodiment, when the dust container 20 is separated from the cleaner body 10, the mounted state of the compression motor 310 and the driving gear 320 on the cleaner body 10 may be maintained, and the driven gear 330 together with the dust container 20 may be separated from the cleaner body 10.

Although the rotational force of the compression motor 310 is transmitted to the rotation shaft 274 of the pressing member 270 through the plurality of gears in the current embodiment, the present disclosure is not limited thereto. For example, the compression motor 310 may be directly coupled to the rotation shaft 274 of the pressing member 270, or the rotational force of the compression motor 310 may be transmitted to the rotation shaft 274 of the pressing member 270 through a single gear.

First and second accommodation parts 282 and 284 in which the driven gear 330 and the driving gear 320 are accommodated may be disposed on the bottom wall 211A of the dust collection body 210. For example, the first and second accommodation parts 282 and 284 may protrude upward from the bottom wall 211A.

Thus, a cutoff part 276 for preventing the pressing plate 272 from interfering with the first accommodation part 282 while the pressing plate 272 rotates may be defined on a lower portion of the pressing plate 272.

At least one portion of the rotation shaft 274 of the pressing member 270 may be traverse through the communication hole 218 of the second wall 212 so that the pressing member 270 compresses the dust stored in the first dust storage part 214. Thus, as the pressing plate 272 increases in horizontal width, a compression area for compressing the dust stored in the first dust storage part 214 may increase.

A rotation center point (see reference symbol C of FIG. 8) of the rotation shaft 274 may be defined in the first dust storage part 214. In this case, the horizontal width of the pressing plate 272 may be defined such that interference with the second wall 212 having the communication hole 218 may be prevented.

Hereinafter, a dust separation process and dust compression process in the dust container according to the current embodiment will be described.

Figure 8:
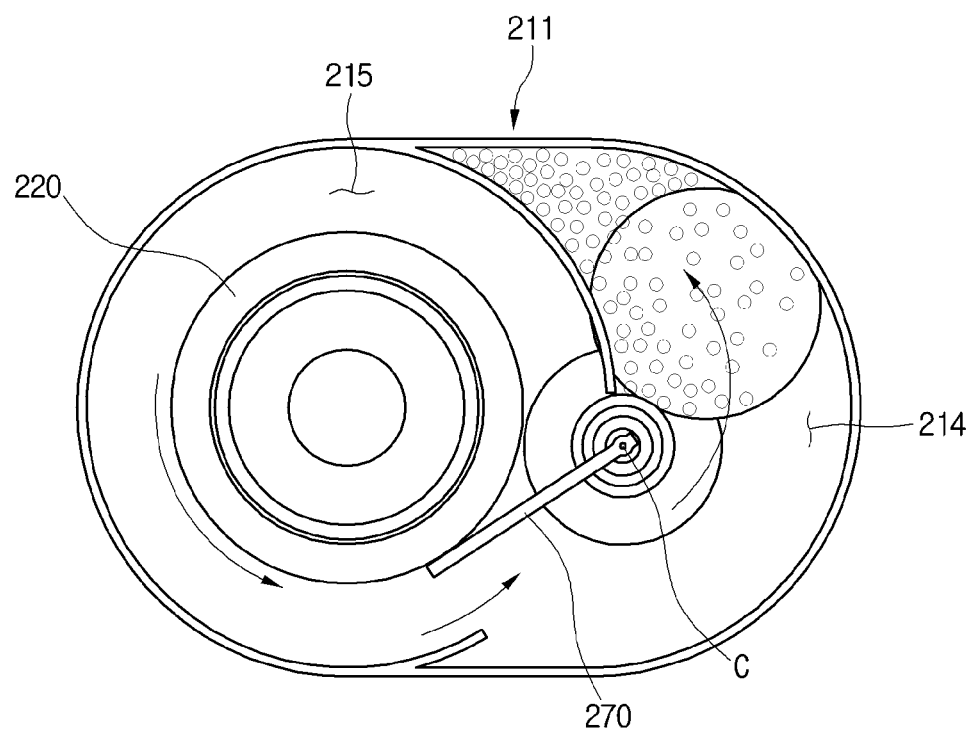
FIG. 8 is a view of a state in which a pressing plate is disposed in a second dust storage part according to the first embodiment.
Figure 9:
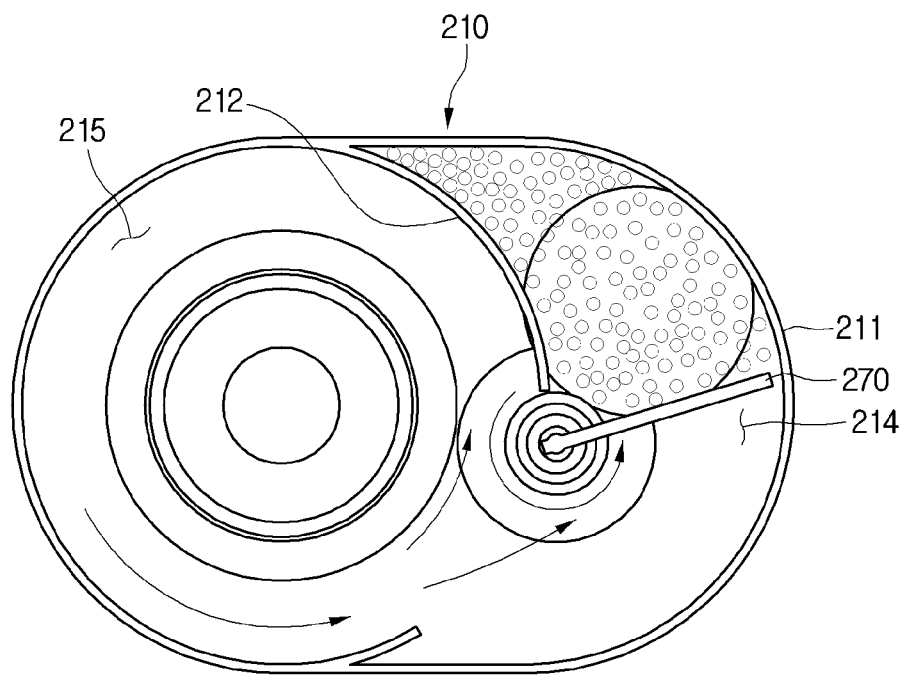
FIG. 9 is a view of a state in which the pressing plate compresses dust in the first dust storage part according to the first embodiment.

FIG. 8 is a view of a state in which a pressing plate is disposed in a second dust storage part according to the first embodiment, and FIG. 9 is a view of a state in which the pressing plate compresses dust in the first dust storage part according to the first embodiment.

Referring to FIGS. 1 to 9, when a power button of the vacuum cleaner 1 is selected, or an operation signal is inputted, the suction motor 11 may operate to generate a suction force. Dust and air may be introduced into the cleaner body 10 by the generated suction force. Then, the dust and air introduced into the cleaner body 10 may be introduced into the dust container 20 through the suction hole 293.

The dust and air introduced into the dust container 20 may flow along the flow guide 294 and then be introduced into the dust collection body 210. That is, the dust and air flowing along the flow guide 294 may be introduced into the dust separation part 213. The dust and air may be separated from each other while spirally flowing along an inner circumferential surface of the dust separation part 213.

A portion of the air separated from the dust may directly pass through the filter 230 that is outside of the air guide 220, and the other portion of the air may be introduced into the air passage P within the air guide 220 through the inflow hole 221 to pass through the filter 230. Then, the air passing through the filter 230 may be discharged to the outside of the dust container 20 through the discharge hole 241 of the filter supporter 240.

The dust separated from the air may move from the second dust storage part 215 and be stored in the first dust storage part 214 through the communication hole 218 of the second wall 212.

While the suction motor 11 operates, power may be applied to the compression motor 310. Although the compression motor 310 is interlocked with the operation of the suction motor in the current embodiment, the present disclosure is not limited thereto. For example, the compression motor 310 may operate when a compression mode is selected by an input part (not shown), or the compression motor 310 may be intermittently automatically turned on or off while the suction motor 11 operates. The current embodiment is not limited to an operation time of the compression motor 310.

When a power is applied to the compression motor 310, the rotational force of the compression motor 310 may be transmitted to the driving gear 320 and the driven gear 330, and thus the pressing member 270 may rotate. The pressing member 270 may be reciprocated and rotate between a position of FIG. 8 (hereinafter, referred to as a "first position") and a position of FIG. 9 (hereinafter, referred to as a "second position").

As illustrated in FIG. 8, while the pressing member 300 rotates in one direction (a clockwise direction in FIG. 8), the pressing member 300 may pass through the communication hole 218 to contact the air guide 220. Thus, the air guide 220 may apply a resistance force to the pressing member 270 in a direction opposite to the rotational direction of the pressing member 270. As a result, the resistance force may be transmitted to the compression motor 310 through the gears 320 and 330, and the compression motor 310 may change in its rotational direction.

In the current embodiment, a portion of the air guide 220 that is in contact with the pressing member 270 may be called a first contact part.

Thus, in the current embodiment, a portion of the pressing member may move from the first dust storage part 214 to the second dust storage part 215 while the pressing member 270 rotates.

While the pressing member 270 is disposed in the second dust storage part 215, the dust spirally flowing within the second dust storage part 215 may be guided by the pressing member 270 to be moved to the first dust storage part 214.

When the compression motor 310 changes in its rotational direction, the pressing member 270 may rotate in the other direction (a counterclockwise direction in FIG. 9). Thus, the pressing member 270 may pass through the communication hole 218 to move from the second dust storage part 215 to the first dust storage part 214. Here, while the pressing member 270 moves from the second dust storage part 215 to the first dust storage part 214, the pressing member 270 may allow the dust piled up on the bottom of the second dust storage part 215 to be moved to the first dust storage part 214.

When the pressing member 270 continuously rotates in the other direction, a region defined by the pressing member 270 and the first and second walls 211 and 212 within the second dust storage part 214 continuously decreases to compress the dust within the region by using the pressing member 270.

While the pressing member 270 rotates in the other direction, the pressing plate 272 may contact the second accommodation part 284. Thus, the second accommodation part 284 may apply a resistance force (an external force) to the pressing member 270 in a direction opposite to the rotational direction of the pressing member 270. As a result, the resistance force may be transmitted into the compression motor 310 through the gears 320 and 330, and the compression motor may change in rotational direction. Thus, the pressing member 270 may rotate again in the previous rotational direction (clockwise direction).

In the current embodiment, a portion of the second accommodation part 284 that is in contact with the pressing member 270 may be called a second contact part.

In another example, the first and second accommodation parts 282 and 284 may be omitted. In this case, the second contact part contacting the pressing member 270 may be disposed on the bottom wall 211A or the first wall 211. Alternatively, the first and second accommodation parts 282 and 284 may be omitted. In this case, the first wall 211 itself may serve as the second contact part.

According to the current embodiment, since the dust stored in the first storage part 214 is compressed, the dust collection performance of the dust container may be improved, and the number of times for emptying the dust container containing the dust may be reduced.

In another example, if the compression motor is the step motor, the rotation direction of the compression motor may change by a control part (not shown). In this case, the control part may acquire the number of steps the compression motor has rotated and then change the rotational direction of the compression motor on the basis of the number of steps rotated.

In this case, the pressing member 270 may change in direction before contacting the first and second contact parts.

Figure 10:
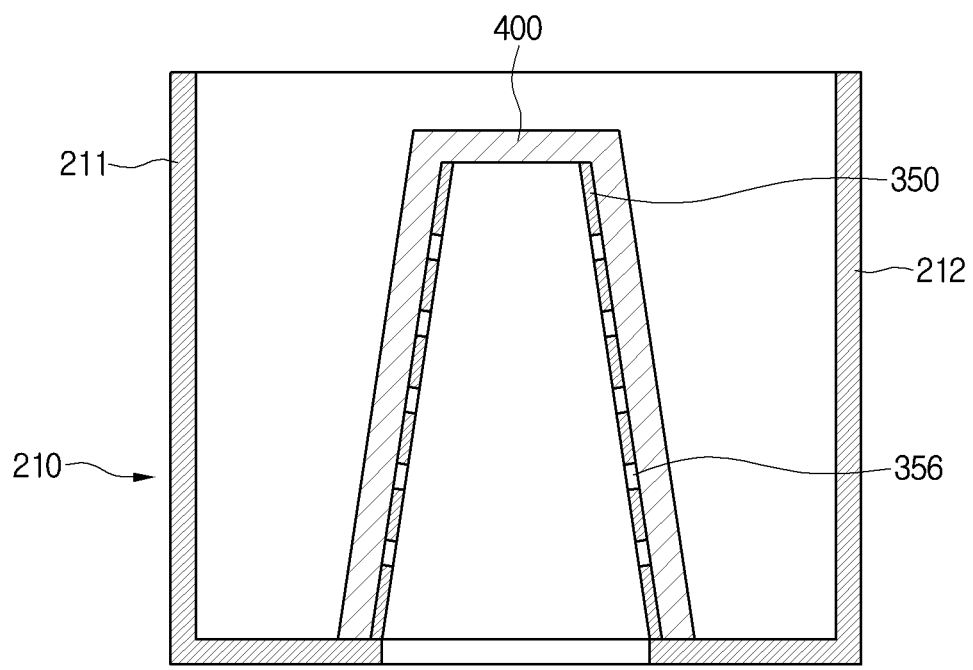
FIG. 10 is a cross-sectional view of a state in which a filter is accommodated in a dust collection body according to a second embodiment.

FIG. 10 is a view of a state in which a filter is accommodated in a dust collection body according to a second embodiment.

The current embodiment is the same as the first embodiment except for positions and shapes of a filter and air guide. Thus, only characterized parts of the current embodiment will be principally described below, and descriptions of the same part as that of the first embodiment will be relied on from the description of the first embodiment.

Referring to FIG. 10, an air guide 350 is disposed in a dust collection body 210 according to the current embodiment. A filter 400 has a shape corresponding to that of the air guide 350 to surround an outer surface of the air guide 350. That is, the air guide 350 is fitted into the filter 400. Also, a plurality of inflow holes 356 through which air passing through the filter 400 flows may be defined in the air guide 350.

In the current embodiment, a surface area of the filter 400 contacting the air is further increased for more improved filtering performance.

Also, when a cover 290 is separated from a dust collection body 210, a user may confirm an entire surface of the filter 400. Thus, the user may determine whether cleaning of the filter 400 is required.

In the current embodiment, since the air guide 350 supports the filter 400, the air guide 350 may be called a filter supporter. The air guide 350 and the filter 400 may be removable through the opening of the bottom wall of the dust collection body.

Figure 11:
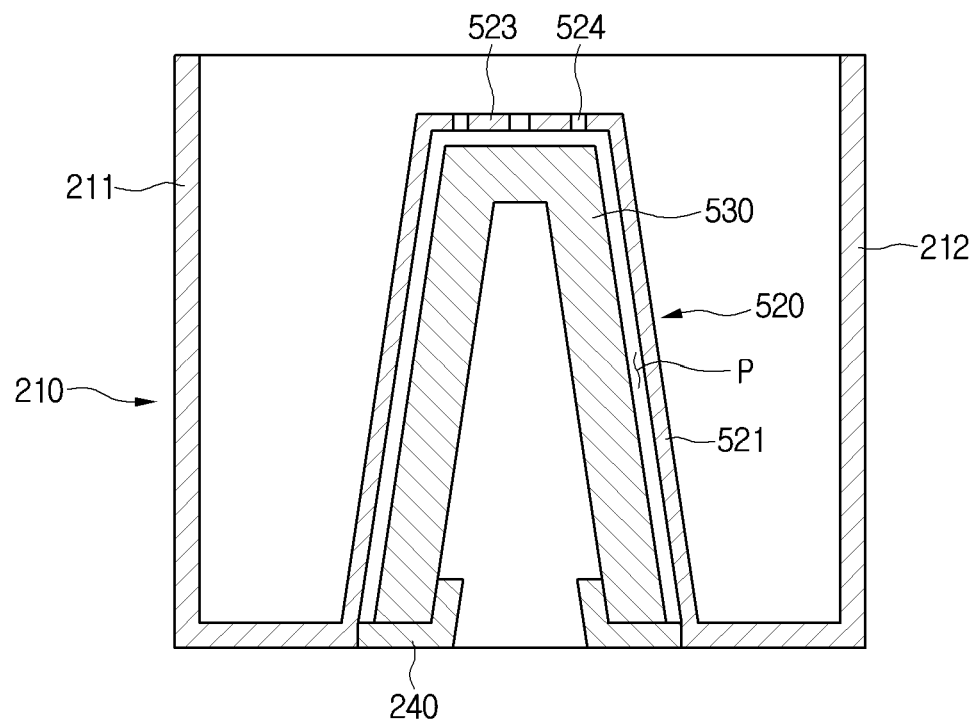
FIG. 11 is a cross-sectional view of a state in which a filter is accommodated in a dust collection body according to a third embodiment.

FIG. 11 is a view of a state in which a filter is accommodated in a dust collection body according to a second embodiment.

The current embodiment is the same as the first embodiment except for positions and shapes of a filter and air guide. Thus, only characterized parts of the current embodiment will be principally described below, and descriptions of the same part as that of the first embodiment will be relied on from the first embodiment.

Referring to FIG. 11, an air guide 520 is disposed in a dust collection body 210 according to the current embodiment.

The air guide 520 may include a body 521 having a cylindrical or truncated cone shape and an upper wall 523 disposed at an upper portion of the body 521 and having an inflow hole 524.

The whole filter 530 may be accommodated within the air guide 520. The filter 530 accommodated within the air guide may have top and side surfaces that are spaced apart from the air guide 520. Thus, an air passage P may be defined between an outer surface of the filter 530 and an inner surface of the air guide 520.

According to the current embodiment, air introduced into the air passage P within the air guide 520 through the inflow hole 524 may pass through the side surface of the filter 530 as well as the top surface of the filter 530.

In the current embodiment, since the inflow hole 524 is defined in the upper wall 523, when a cover is separated from a dust collection body 210, a state of the upper portion of the filter 530 may be confirmed through the inflow hole 524.

An additional embodiment is proposed.

Although the suction hole and the air guide are provided in the cover in the foregoing embodiments, the current embodiment is not limited thereto. For example, the suction hole may be defined in the dust collection body 210. In this case, the suction hole may be defined in the upper portion of the first wall constituting the dust separation part.

Also, although the dust separation part and the second dust storage part are defined by the first and second walls in the forgoing embodiments, the current embodiment is not limited thereto. For example, the second dust storage part may be defined by the first and second walls, and the dust separation part having a cylindrical shape may be provided as a separate part and then be accommodated into a space defined by the first and second walls. In this case, an upper portion of each of the air guide and the filter may be accommodated into the dust separation part.

Although the dust collection body includes the first and second dust storage parts in the foregoing embodiments, the current embodiment is not limited thereto. For example, the dust collection body may include only the second dust storage part. In this case, the dust collection body may be defined by only the first wall, and the second wall having the communication hole may be omitted.

Also, although the pressing member is disposed on the dust collection body to rotate by the driving device in the foregoing embodiments, the current embodiment is not limited thereto. For example, the pressing member and the driving device may be omitted.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
a cleaner body; and
a dust container separably mounted at the cleaner body, wherein the dust container comprises:
a dust collection body comprising a first opening and a wall, the dust collection body comprising a dust separation part;
a cover covering the first opening of the dust collection body;
an air guide comprising a second opening and an end, the air guide having the end disposed at the wall of the dust collection body, the second opening of the air guide providing an inflow hole through which air separated from dust in the dust separation part is introduced; and
a filter accommodated in the air guide to filter the air separated from the dust,
wherein when the cover uncovers the first opening of the dust collection body, the filter is visible through the second opening of the air guide.

2. The vacuum cleaner according to claim 1, wherein a third opening is defined at the wall of the dust collection body, and the filter is insertable or withdrawable from the air guide through the third opening.

3. The vacuum cleaner according to claim 2, further comprising a filter supporter to support the filter, the filter supporter coupleable to the wall of the dust collection body through the third opening,
wherein the filter supporter comprises a discharge hole through which the air passing through the filter is discharged.

4. The vacuum cleaner according to claim 3, wherein the filter is hollow with a fourth opening, and
the filter supporter comprises a support rib insertable into the fourth opening of the filter.

5. The vacuum cleaner according to claim 3, wherein the third opening of the dust collection body comprises a protrusion part to couple the filter supporter to the wall of the dust collection body, and
a coupling rib at which the protrusion part couples is disposed at the filter supporter.

6. The vacuum cleaner according to claim 1, wherein an upper portion of the filter protrudes from the inflow hole of the air guide and is disposed higher than the inflow hole of the air guide.

7. The vacuum cleaner according to claim 1, wherein the air guide comprises an upper wall having the inflow hole, and
a top surface of the filter accommodated at the air guide is spaced apart from the upper wall of the air guide.

8. The vacuum cleaner according to claim 1, wherein a portion of the air separated from the dust at the dust separation part passes through the filter exposed from the air guide, and an another portion of the air is introduced into an air passage between the air guide and the filter to pass through the filter.

9. The vacuum cleaner according to claim 1, wherein the dust collection body comprises a first wall and a second wall to partition an inner space of the first wall into a first dust storage part and a second dust storage part,
the dust separation part is disposed above the second dust storage part, and
the air guide is disposed at least within the second dust storage part.

10. The vacuum cleaner according to claim 9, wherein when the cover uncovers the first opening of the dust collection body, an inside of the first dust storage part and the second dust storage part are visible.

11. The vacuum cleaner according to claim 9, wherein the second wall of the dust collection body comprises a communication hole through which dust within the second dust storage part is movable to the first dust storage part.

12. The vacuum cleaner according to claim 1, wherein the dust collection body comprises a main wall to define the dust separation part and a second dust storage part, and an auxiliary wall that surrounds the main wall to define a first dust storage part, the dust separation part is disposed above the second dust storage part, and the air guide is disposed within at least the second dust storage part.

13. The vacuum cleaner according to claim 12, wherein the main wall of the dust collection body comprises a communication hole through which the dust within the second dust storage part is movable to the first dust storage part.

14. A vacuum cleaner comprising:
a cleaner body; and
a dust container separably mounted at the cleaner body, wherein the dust container comprises:
a dust collection body comprising a wall and a dust separation part, the wall of the dust collection body comprising an opening;
an air guide comprising an inflow hole and an end, the end of the air guide disposed at the wall of the dust collection body;
a filter accommodated at the air guide to filter the air separated from the dust,
wherein an air passage through which the air introduced through the inflow hole flows is defined between the air guide and the filter,
wherein the air passing through the air passage and through the filter is discharged through the opening of the wall of the dust collection body.

15. The vacuum cleaner according to claim 14, further comprising a filter supporter to support the filter, wherein the filter supporter comprises at least one hole through which the air passing through the filter passes.

16. The vacuum cleaner according to claim 14, wherein the dust container further comprises a cover to cover the dust collection body, and
when the cover uncovers the dust collection body, the filter is visible through the inflow hole of the air guide.

17. The vacuum cleaner according to claim 15, wherein the filter supporter is inserted into the filter and the filter supporter is coupleable to the wall of the dust collection body through the opening.

* * * * *